Nov. 20, 1962 R. M. BUCHWALD 3,064,750
LEAF SPRING SWING AXLE SUSPENSION
Filed April 27, 1961 2 Sheets-Sheet 1
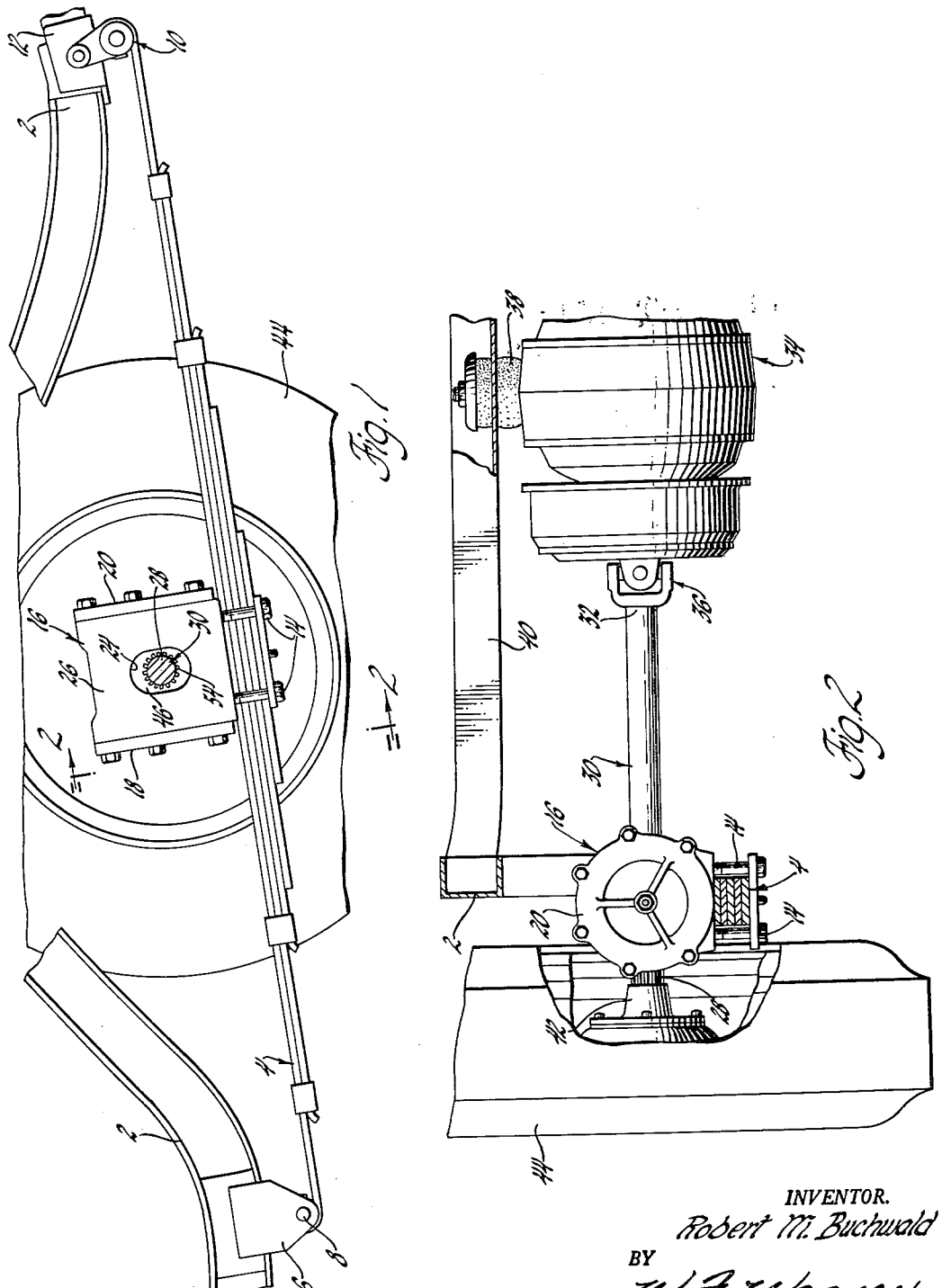
INVENTOR.
Robert M. Buchwald
BY
W. F. Wagner
ATTORNEY

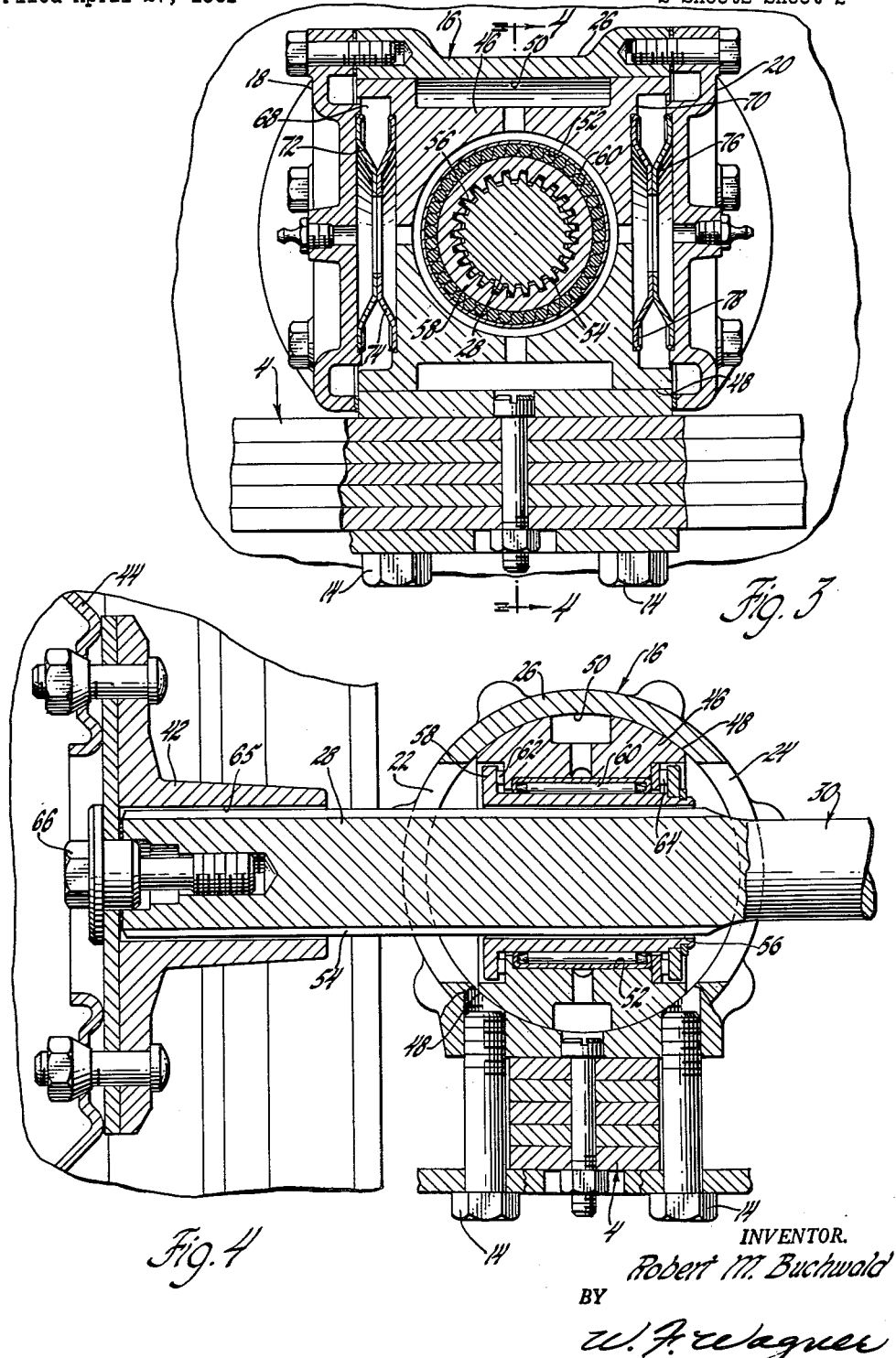

United States Patent Office 3,064,750
Patented Nov. 20, 1962

3,064,750
LEAF SPRING SWING AXLE SUSPENSION
Robert M. Buchwald, Berkley, Mich., assignor to General Motors Corporation, Detroit, Mich., a corporation of Delaware
Filed Apr. 27, 1961, Ser. No. 105,954
5 Claims. (Cl. 180—73)

This invention relates to vehicle suspension and more particularly to improvements in swing axle suspension utilizing longitudinal leaf springs as the elastic medium.

In the prior art, it has already been proposed to utilize swinging half axle drives for the rear wheels of vehicles wherein the outer end of each half axle is connected to the midportion of a longitudinally extending leaf spring. In certain constructions of this type, means have been provided which allow the respective half axles to move axially with respect to the longitudinal vertical plane of deflection of the leaf spring and angularly with respect to the horizontal plane thereof in order to eliminate lateral bending and torsional loads on the leaf springs under conditions of pronounced compression and rebound deflection of the wheels. In general, this has been accomplished by mounting a bearing assembly on the leaf spring, a portion of which is angularly movable in a plane normal to the plane of deflection of the spring. This portion is also provided with a transverse bearing portion which slidably and rotatably supports the outer end of the half axle. However, in these and other leaf spring swing axles, it is possible to generate high impact on the half axle in a longitudinal direction as a result of road wheel contact with road obstacles. Under such circumstances, road wheel impact in a longitudinal direction is transmitted directly to the leaf springs through the journaling means for the outboard end of each half axle. This not only causes transmission of road noises directly to the vehicle, but also increases the risk of axle breakage and bearing damage owing to the lack of yieldability of the slidable connection in the longitudinal direction.

An object of the present invention is to provide an improved swing axle suspension.

Another object is to provide a swing axle suspension of the type utilizing longitudinal leaf springs wherein the axle is axially slidable relative to the leaf spring vertical longitudinal plane and incorporates means for cushioning longitudinal shock between the axle journaling means and the spring.

A further object is to provide a construction of the stated character wherein the leaf spring is provided with axle journaling means which are angularly movable relative to said spring in a vertical transverse plane and incorporates internally splined radial load supporting bearing means which is adapted to receive the outboard end of the half axle which is correspondingly splined, the splines of the outboard end of the half axle also serving to establish rotational locking engagement with the vehicle wheel.

A still further object is to provide axle journaling means which are mounted in a spring supported housing and are capable of angular movement therein in a vertical transverse plane, wherein the journaling means is yieldably biased longitudinally to a predetermined central position relative to the journal housing by opposed springs which permit limited movement of the journaling means in the direction of the length of the leaf springs so as to reduce longitudinal shock resulting from road wheel impact.

These and other objects, advantages, and features of the invention will become more fully apparent as reference is had to the accompanying specification and drawings wherein:

FIG. 1 is a fragmentary side elevational view of a portion of a rear wheel swing axle suspension incorporating axle supporting means in accordance with the invention;

FIG. 2 is a front elevational view looking in the direction of arrows 2—2 of FIG. 1;

FIG. 3 is an enlarged side elevational view, partly in section, showing the details of construction of the journaling means for the outboard end of the swing axle; and FIG. 4 is a view looking in the direction of arrows 4—4 of FIG. 3.

Referring now to the drawings and particularly FIG. 1, there is shown a portion of a vehicle wherein the reference numeral 2 designates one of two parallel longitudinally extending side rails of a conventional vehicle frame. Disposed beneath and slightly outboard of side rail 2 is a laminated leaf spring assembly 4, the forward end of which is connected to an outrigger bracket 6 by a pivot pin 8. The rearward end of spring 4 in turn is connected by a shackle assembly 10 to a second outrigger bracket 12 mounted on side rail 2 rearwardly of bracket 6. Secured longitudinally intermediately on spring 4 by bolts 14 is a generally cylindrical housing 16 having bolted on end caps 18 and 20. Extending transversely through apertures 22 and 24 in the main cylindrical body 26 of housing 16 is the outboard end 28 of a swingable live axle 30. The inboard end 32 of live axle 30 in turn is connected to a differential drive mechanism 34 by means of a universal joint 36. As seen in FIG. 2, differential 34 is resiliently suspended by elastic buffers 38 from a frame cross member 40 which extends transversely between side rail 2 and the corresponding side rail, not shown, at the opposite side of the vehicle. The terminal extremity of outer end 28 of half axle 30 projects laterally beyond housing 16 and is rigidly connected in a manner shortly to be described to a flanged hub 42 riveted to driving wheel 44. As will be evident from FIG. 2, vertical deflection of wheel 44 requires that half axle 30 swing through a vertical arc generated from the geometric center of universal joint 36, while deflection of spring 4 preferably occurs in a vertical longitudinal plane parallel with the plane of the wheel when the latter is in a normal position shown. Therefore, a geometric conflict occurs which would normally result in both torsional and lateral bending loads being applied to the leaf spring. In the present invention, as seen best in FIG. 4, this conflict is overcome by disposing within housing 16 a bearing support 46, having a segmental cylindrical outer surface 48 which rotatably engages the inner cylindrical bore 50 of the housing and is angularly movable on a longitudinal axis concentric therewith. Bearing support 46 is also formed with a transverse bore 52 aligned with openings 22 and 24 in which the outer end 28 of axle 30 is rotatably and slidably supported. Hence, when spring 4 deflects through a vertical path, the accompanying angular movement of half axle 30 is accommodated by rotation of bearing support 46 within housing 16 while change in linear distance between housing 16 and universal joint 36 is accommodated by axial movement of axle 30 in bore 52.

According to one feature of the invention, the outer end 28 of axle 30 is provided with male splines 54, the inboard portion of which engages cooperating female splines 56 formed in a sleeve 58. Sleeve 58 in turn is rotatably mounted in bore 52 of bearing support 46 by a radial needle bearing assembly 60 and a pair of thrust type needle bearing assemblies 62 and 64 which position the sleeve axially of bearing support 46. Thus, sleeve 46 is caused to rotate with half axle 30, while axial movement of axle 30 relative to the plane of deflection of spring 4 occurs between the outer splined end of the half axle ad the inner splines 56 of sleeve 58.

According to another feature of the invention, the terminal extremity of splines 54 engage female splines 65 formed in hub 42 of vehicle wheel 44. As seen best in FIG. 4, hub portion 42 and wheel 44 are maintained in assembled interlocking relation by means of a single lug bolt 66 which is threaded axially into the end of the half axle splined portion 54. Because of the corresponding diameter of the internal splines on the hub portion 42 of sleeve 58, the entire half axle 30 is readily demountable from both the wheel and the housing 16 by merely removing the bolt 66 and disconnecting the universal joint 36 after which the entire axle may be withdrawn by axial inward movement relative to sleeve 58.

According to the principal feature of the invention, means are provided to cushion longitudinal impact exerted on the outboard end of the half axle so as to reduce shock imposed on the axle 30, bearing 60, and the associated parts of the housing 16. As seen best in FIG. 3, the longitudinally opposite ends of bearing support 46 are provided with circular relieved portions 68 and 70 which face, respectively, the forward end rearward end caps 18 and 20 of housing 16. Disposed within recesses formed between end caps 18 and 20 and relieved portions 68 and 70 are pairs of Belleville washers 72, 74 and 76, 78 disposed in back-to-back relation and prestressed by assembling of end caps 18 and 20 so as to bias bearing support 46 to a position longitudinally midway of housing 16. It will now be evident that shock loads applied in a longitudinal direction on the splined outer end of axle 30 will be yieldably absorbed by the Belleville washers. For example, if axle 30 is moved toward the right as seen in FIG. 3, Belleville washers 72, 74 will compress allowing axle 30, sleeve 58, and bearing support 46 to move longitudinally within bore 50 of housing 16 through a distance determined by the mechanical limits of compression of the washers. Hence, transient high impact is absorbed by the Belleville springs rather than imposing shock loads which might cause the splined end of axle 30 to fracture or alternatively to produce excessive localized loads on needle bearing 60. In addition, even where such loads would be insufficient to cause permanent damage, a construction according to the present invention reduces the transmission of road shock directly to the spring 4 and hence substantially reduces transmission of road noise to the vehicle body and frame.

From the foregoing it will be seen that a novel and improved swing axle suspension has been provided. The construction described not only eliminates any geometric conflict in the general arrangement, but in addition greatly increases the tolerance to longitudinal wheel impact.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. In a vehicle, a chassis, an axle carrier resiliently connected to the chassis, vertically swingable live axles extending in lateral opposite directions from said axle carrier and supporting vehicle wheels at the outer ends thereof, means articulatably connecting the axles to the axle carrier, laterally spaced longitudinally extending leaf springs connected to the chassis, a cylindrical housing mounted on each spring, a bearing support rotatably disposed within each housing, a splined sleeve extending transversely of each support, anti-friction bearings between said sleeves and said supports, means forming splines on the outer end of each axle which slidably cooperate with said sleeves to provide radial support for the outer end of each axle while allowing axial movement of said axles relative to said housings, and spring means disposed between the opposite ends of said bearing support and the adjacent ends of said housing for resiliently absorbing longitudinal impact on said axles.

2. The structure set forth in claim 1 wherein said spring means comprises Belleville springs arranged in back-to-back relation.

3. The structure set forth in claim 2 wherein said housings having connected thereto detachable end caps which pre-load the Belleville spring when assembled in abutting engagement with the ends of the housing.

4. The structure set forth in claim 1 wherein the vehicle wheels are formed with hubs having internal splines by which the wheels are affixed to the splined outer ends of the axles in non-rotatable locking engagement.

5. The structure set forth in claim 4 wherein the hub and sleeve splines are similar in form and dimension.

References Cited in the file of this patent

UNITED STATES PATENTS

| | | |
|---|---|---|
| 1,940,795 | Gerardi | Dec. 26, 1933 |
| 2,280,347 | Olley et al. | Apr. 21, 1942 |
| 2,956,632 | Forbush et al. | Oct. 18, 1960 |